United States Patent [19]

Crivello et al.

[11] 4,356,050
[45] Oct. 26, 1982

[54] METHOD OF ADHESIVE BONDING USING VISIBLE LIGHT CURED EPOXIES

[75] Inventors: James V. Crivello, Clifton Park; Bruce A. Ashby, Schenectady, both of N.Y.

[73] Assignee: General Electric Company, Schenectady, N.Y.

[21] Appl. No.: 102,337

[22] Filed: Dec. 11, 1979

[51] Int. Cl.³ .................. B29C 19/02; B29C 27/30
[52] U.S. Cl. .................. 156/273.3; 156/330; 204/159.18; 204/159.24; 427/53.1; 428/412; 428/414; 428/415
[58] Field of Search .............. 156/272, 330; 260/37 EP; 204/159.18, 159.24; 428/412, 415, 414; 528/89, 92; 427/53.1

[56] References Cited

U.S. PATENT DOCUMENTS

| | | | |
|---|---|---|---|
| 3,074,869 | 1/1963 | Workman | 204/159.18 |
| 3,258,356 | 6/1966 | Caldwell et al. | 428/415 |
| 3,340,224 | 9/1967 | Sherman et al. | 156/330 |
| 3,450,613 | 6/1969 | Steinberg | 204/159.18 |
| 3,655,818 | 4/1972 | McKown | 427/208.2 |
| 3,708,296 | 1/1973 | Schlesinger | 204/159.18 |
| 3,794,576 | 2/1974 | Watt | 204/159.11 |
| 3,826,650 | 7/1974 | Schlesinger | 204/159.18 |
| 4,026,705 | 5/1977 | Crivello et al. | 204/159.24 |
| 4,058,401 | 11/1977 | Crivello | 204/159.18 |
| 4,090,936 | 5/1978 | Barton | 204/159.24 |
| 4,113,497 | 9/1978 | Schlesinger | 204/159.18 |
| 4,160,064 | 7/1979 | Nosiff | 260/37 EP |
| 4,218,279 | 8/1980 | Green | 156/330 |
| 4,219,377 | 8/1980 | Albrecht | 156/330 |

*Primary Examiner*—John J. Gallagher
*Attorney, Agent, or Firm*—Hedman, Casella, Gibson & Costigan

[57] ABSTRACT

Dye sensitized epoxy resins containing an iodonium salt cationic photoinitiator can be used in a variety of adhesive bonding applications. Using low intensity visible light, cure can be initiated after a short exposure of resin coated surfaces followed by clamping the subject pieces together for a time sufficient for a permanent bond to form.

15 Claims, No Drawings

METHOD OF ADHESIVE BONDING USING VISIBLE LIGHT CURED EPOXIES

The present invention relates to a method for producing adhesively bonded composite articles. More particularly, it relates to the low intensity visible light photoinitiation of dye-sensitized epoxy resins containing iodonium salts followed by formation of a strong bond by self polymerization.

BACKGROUND OF THE INVENTION

A large variety of room temperature curing epoxy adhesives are currently on the market. These materials usually consist of amine curing epoxide prepolymers, and are packaged as two-component systems which must be mixed prior to use. One-component epoxy resin systems catalyzed by exposure to radiant energy, especially light in the ultraviolet, near ultraviolet and visible range of the spectrum are described in Crivello and Schroeter, U.S. Pat. No. 4,026,705; Barton, U.S. Pat. No. 4,090,936, Watt, U.S. Pat. No. 3,794,576; Schlesinger, U.S. Pat. No. 3,826,650; and Crivello, U.S. Pat. No. 4,058,401. The foregoing patents are incorporated herein by reference. In Crivello and Schroeter, U.S. Pat. No. 4,026,705 is described the use of dyes to sensitize iodonium salt decomposition for the visible light cure of epoxy materials. In an application of this chemistry to adhesive use, the U.S. Pat. No. 4,026,705 describes mixing an epoxy novolac and a vinylcyclohexene dioxide with 4,4'-dimethyldiphenyliodonium hexafluoroarsenate and acridine orange dye. Placing a drop of the mixture between two transparent glass slides and exposing them to a photoflood lamp for 15 seconds produced a rigid glass to glass bond. Because the cure speed is so high, the bonding of two opaque materials is difficult if not impossible under these conditions.

It has now been found possible, using low intensity light sources, to achieve a delayed cure of epoxy materials. By this technique parts coated with dye sensitized resin are simply exposed to a low density source of visible light, e.g., an incandescent lamp, assembled and clamped, if necessary. Permanent, strong adhesive bonds are obtained on standing, away from exposure to light, e.g., within 1–16 hours at room temperature.

It is well known that cationic polymerizations are "living", non-terminating systems. Once initiated, these polymerizations proceed until all the monomer has been consumed or until a ring-chain equilibrium is attained. This principle is used in the presently employed dye sensitized cure of epoxies for adhesive applications.

Light sources most convenient for use herein are 100 and 150 watt incandescent light bulbs. A wide variety of epoxy materials, such as bisphenol-A-diglycidyl ethers, novolac-epoxy resins, and cycloaliphatic epoxy compounds can be formulated into the compositions of this invention. Among the dyes which have been found to be useful for sensitizing iodonium salt photoinitiators are acridine orange, acridine yellow, benzoflavin, phosphine R, Michler's Ketone, hematoporphyrin and setoflavin T. Iodonium salts capable of photoinitiating epoxide polymerization have the following general structure:

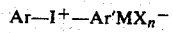

wherein Ar and Ar' are substituted or non-substituted aromatic radicals, and $MX_n^-$ is a complex metal halide in which M is B, As, Sb, P, and the like, and X is $Cl^-$, $Br^-$ or $F^-$, and n is from 4 to 7.

A variety of agents can be employed to increase tack, promote adhesion and improve bond strength in conventional amounts as is well known in the art.

Adhesives prepared according to this invention may be used to bond glass, paper, wood, ceramics, metals, or plastics, to themselves or to each other.

DESCRIPTION OF THE INVENTION

According to the present invention in its broadest aspects, there is provided a method of making a composite, adhesively-bonded article which comprises:

(1) applying to at least a part of one substrate a visible light-polymerizable composition comprising:
 (i) an epoxy monomer or resin;
 (ii) a diaryliodonium salt;
 (iii) a sensitizing dye and, optionally;
 (iv) additives such as extenders, fillers, tackifiers, etc.;

(2) exposing said composition to a low intensity source of visible light for not substantially longer than required to initiate photopolymerization therein and discontinuing exposure to light;

(3) simultaneously or thereafter bringing the exposed surface into contact with another surface to produce a temporary adhesive bond therebetween;

(4) allowing sufficient time in the dark to elapse for the composition to substantially completely self-polymerize and produce a permanent adhesive bond.

The components (i) (ii) and (iii) of the composition are completely described in the above-mentioned U.S. Pat. No. 4,026,705, which will be incorporated herein to avoid unnecessarily-detailed description.

The term "epoxy resin" or "epoxidic prepolymer" contemplates any monomeric, dimeric or oligomeric or polymeric epoxy material containing one or a plurality of epoxy functional groups. For example, those resins which result from the reaction of bisphenol-A (4,4'-isopropylidenediphenol) and epichlorohydrin, or from the reaction of low molecular weight phenol-formaldehyde resins (Novolak resins) with epichlorohydrin, can be used alone or in combination with an epoxy containing compound as a reactive diluent. Such diluents as phenyl glycidyl ether, 4-vinylcyclohexene dioxide, limonene dioxide, 1,2-cyclohexene oxide, glycidyl acrylate, glycidyl methacrylate, styrene oxide, allyl glycidyl ether, etc., may be added as viscosity modifying agents.

In addition, the range of these compounds can be extended to include polymeric materials containing terminal or pendant epoxy groups. Examples of these compounds are vinyl copolymers containing glycidyl acrylate or methacrylate as one of the comonomers. Other classes of epoxy containing polymers amenable to cure using the above catalysts are epoxy-siloxane polymers, epoxy-polyurethanes and epoxy-polyesters. Such polymers usually have epoxy functional groups at the ends of the chains. Epoxysiloxane resins and method for making are more particularly shown by E. P. Pluedemann and G. Fanger, J. Am. Chem. Soc. 81, 2632–5 (1959). As described in the literature, epoxy resins can also be modified in a number of standard ways such as reactions with amines, carboxylic acids, thiols, phenols, alcohols, etc., as shown in U.S. Pat. Nos. 2,935,488; 3,235,620; 3,369,055; 3,379,653; 3,398,211; 3,403,199; 3,563,850; 3,567,797; 3,677,995, etc. Further examples of epoxy resins which can be used are shown in the Encyclopedia of Polymer Science and Technology, Vol. 6, 1967, Interscience Publishers, New York, 209–271.

The iodonium salts are compounds of the formula, $$[(R)_a(R^1)_b I]_c^+ [MQ_d]^{-(d-e)} \quad (1)$$

wherein R is a monovalent aromatic organic radical, $R^1$ is a divalent aromatic organic radical, M is a metal or metalloid and Q is a halogen radical such as Cl, F, Br, I, etc., a is a whole number equal to 0 to 2, b is a whole number equal to 0 or 1, the sum of a+b is equal to 2 or the valence of I, c = d − e e = valence of M and is an integer equal to 2 to 7 inclusive, and d is > e and is an integer having a value up to 8.

Radicals included by R can be the same or different, aromatic carbocyclic or heterocyclic radical having from 6 to 20 carbon atoms, which can be substituted with from 1 to 4 monovalent radicals selected from $C_{(1-8)}$ alkoxy, $C_{(1-8)}$ alkyl, nitro, chloro, etc., R is more particularly, phenyl, chlorophenyl, nitrophenyl, methoxyphenyl, pyridyl, etc. Radicals included by $R^1$ are divalent radicals such as

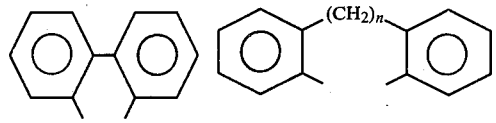

etc. Metals or metalloids included by M of formula 1 are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc. and metalloids such as B, P, As, etc. Complex anions included by $MQ_d^{-(d-e)}$ are, for example, $BF_4^-$, $PF_6^-$, $AsF_6^-$, $SbF_6^-$, $FeCl_4^=$, $SnCl_6^=$, $SbCl_6^-$, $BiCl_5^=$, etc.

Iodonium salts included by formula 1 are, for example,

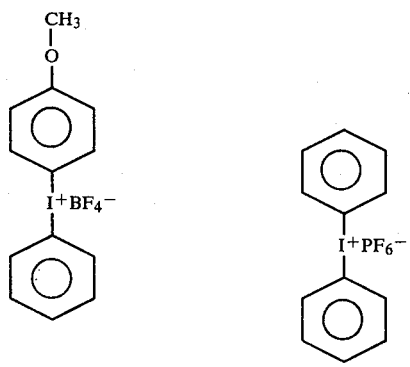

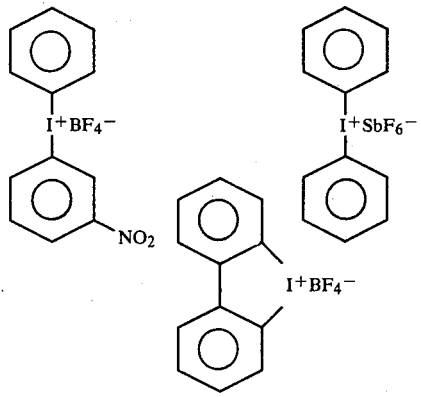

The iodonium salts of formula 1 are well known and can be made by the procedures described in U.S. Pat. No. 4,026,705 and references cited therein.

Dyes which can be used in combinatin with the above identified aryliodonium salts in the practice of the invention are cationic dyes, such as shown in Vol. 20, p. 194-7 of the Kirk-Othmer Encyclopedia, 2nd Edition, 1965, John Wiley & Sons, New York. Some of the cationic dyes which can be used are, for example, Acridine orange; C.I. 46005
Acridine yellow; C.I. 46035
Phosphine R; C.I. 46045
Benzoflavin; C.I. 46065
Setoflavin T; C.I. 49005.

In addition to the above, basic dyes can also be used. Some of these basic dyes are shown in Vol. 7, p. 532-4 of Kirk-Othmer Encyclopedia, as cited above and include Hematoporphyrin
4,4'-bisdimethylaminobenzophenone
4,4'-bisdiethylaminobenzophenone.

In addition to the above, a combination of dyes also can be used to sensitize the decomposition of diaryliodonium salts to the complete visible spectrum. It has been found that this procedure results in better use of the energy available from visible light sources and also increases the rate of cure.

Experience has shown that the proportions of iodonium salt to the epoxy resin can vary widely inasmuch as the salt is substantially inert, unless activated. Effective results can be achieved, for example, if a proportion of from 0.1 to 15, and preferably 0.1 to 10 parts by weight per 100 part by weight of epoxidic component (i). Higher or lower amounts can be used, however, depending upon factors such as the nature of the epoxy resin, intensity of radiation, cure time desired, etc. In addition, the proportions of the dye can vary, e.g., from 0.001 to 3 parts by weight per 100 parts by weight of said epoxidic component (i).

Cure of the epoxy composition can be achieved by activating the iodonium salt to provide the release of the Lewis Acid catalyst. Activation of the iodonium salt can be achieved by exposing the curable composition to visible radiant energy, such as tungsten light, daylight or fluorescent light. Cure of the compositions is preferably initiated by the use of tungsten light having a wavelength of from 3800A to 8000A and an intensity of about 150 watts. The lamp systems useful in the practice of the invention can consist of commercially available tungsten filament light bulbs, fluorescent lamps, and the like.

DESCRIPTION OF THE PREFERRED EMBODIMENTS

The following examples illustrate the method of the present invention. They are not to be construed to limit the claims in any manner whatsoever.

EXAMPLE 1

A mixture composed of 70 parts of epoxylated novolac (Dow DEN-431) and 30 parts of 4-vinylcyclohexene dioxide (Ciba-Geigy RD-4) is mixed with 3 parts of 4,4'-dimethyldiphenyliodonium hexafluoroarsenate (Crivello and Schroeter, U.S. Pat. No. 4,026,705) and 0.3 parts of acridine orange. The sensitized solution is spread on two glass plates and exposed for 5 minutes to a 100 W incandescent lamp. Following the irradiation, the plates are placed together and allowed to stand in the dark. A strong, permanent adhesive bond is formed in 1 hour, such that the glass plates cannot be pulled apart.

When the above-sensitized epoxy mixture is exposed for 10 minutes to light, the mixture cures to such an extent that a good adhesive bond can not be made.

EXAMPLE 2

The procedure of Example 1 is repeated, substituting an equivalent amount of benzoflavin for the acridine orange dye. Exactly analogous results are obtained.

EXAMPLE 3

To 100 g. of bisphenol-A diglycidyl ether there is added 0.3 g of acridine orange and 3 g. of 4,4'-dimethyldiphenyliodonium hexafluoroarsenate. A film of the sensitized epoxy mixture is drawn on glass plates and they are exposed as described previously to a 150 W lamp for 5 minutes. When the plates have been clamped together and allowed to stand in the dark, a strong adhesive bond is formed after 2–3 hours.

EXAMPLE 4

An adhesive is prepared by combining 50 parts of epoxylated novolac (DEN 431) with 1.5 parts of 4,4'-di-t-butyldiphenyliodonium hexafluoroantimonate and 0.15 parts of acridine orange. The mixture is applied to glass plates as described in Example 1. Ten minutes of irradiation is required to initiate the cure, then after 2 hours in the dark, a permanent bond is formed.

EXAMPLE 5

The procedure of Example 4 is repeated using the same epoxy resin mixture to bond glass cloth to a glass plate. A 10-minute irradiation followed by a 2-hour standing period is required to produce a permanent bond.

EXAMPLE 6

The composition as described in Example 1 is used to bond two sheets of aromatic polycarbonate resin (General Electric Co., LEXAN) together. The irradiation and permanent cure times are identical to those observed in Example 1.

EXAMPLE 7

The procedure of Example 1 is repeated, substituting an equivalent amount of diphenyliodonium hexafluorophosphate for the 4,4'-dimethyldiphenyliodonium hexafluoroarsenate. Substantially the same results are obtained.

The foregoing detailed description will suggest many variations to those skilled in this art. All such obvious variations are within the full intended scope of the appended claims.

We claim:

1. A method of making a composite adhesively-bonded article which comprises:
   (1) applying to at least a part of one substrate a visible light-polymerizable composition consisting essentially of:
      (i) an epoxidic prepolymer;
      (ii) an effective amount of a catalyst precursor therefor comprising an aromatic iodonium salt of a complex halogenide; and
      (iii) a small but effective amount of a catalyst activator comprising a dye;
   (2) exposing said composition to a low intensity source of visible light for not substantially longer than required to initiate polymerization therein and discontinuing exposure to said source of light;
   (3) simultaneously with discontinuing exposure or thereafter bringing the exposed surface of the composition-coated substrate into close contact with at least a part of the same or a different substrate to produce a temporary adhesive bond therebetween; and
   (4) allowing sufficient time in the dark to elapse for the composition to substantially completely self-polymerize and produce a permanent adhesive bond.

2. A method as defined in claim 1 wherein said aromatic iodonium salt (ii) is of the formula $$[(R)_a(R^1)_bI]_c{}^+ MQ_d]^{-(d-e)}$$

wherein R is a monovalent aromatic organic radical, $R^1$ is a divalent aromatic organic radical, M is a metal or metalloid and Q is a halogen radical, a is a whole number equal to 0 or 2, b is a whole number equal to 0 or 1, the sum of a+b is equal to 2 or the valence of I, c=d−e, e=valence of M and is an integer equal to 2 to 7 inclusive and d>e and is an integer having a value up to 8.

3. A method as defined in claim 1 wherein said aryl iodonium salt (ii) comprises from 0.1 to 10 parts by weight per 100 parts by weight of said epoxidic prepolymer (i).

4. A method as defined in claim 1 wherein said dye (iii) is selected from acridine orange, acridine yellow, phosphine R, benzoflavin, Michler's Ketone, hematoporphyrin, setoflavin T, or a mixture of any of the foregoing.

5. A method as defined in claim 1 wherein said dye (iii) comprises from 0.001 to 3 parts by weight per 100 parts by weight of said epoxidic prepolymer (i).

6. A method as defined in claim 1 wherein said aromatic iodonium salt (ii) is 4,4'-dimethyldiphenyliodonium hexafluoroarsenate.

7. A method as defined in claim 1 wherein said aromatic iodonium salt (ii) is 4,4'-di-t-butyldiphenyliodonium hexafluoroantimonate.

8. A method as defined in claim 1 wherein said aromatic iodonium salt (ii) is diphenyliodonium hexafluorophosphate.

9. A method as defined in claim 1 wherein said dye (iii) is acridine orange.

10. A method as defined in claim 1 wherein said dye (iii) is benzoflavin.

11. A method as defined in claim 1 wherein said substrate or substrates comprise a material selected from glass, paper, wood, ceramics, metals, plastic, or a mixture of any of the foregoing.

12. A method as defined in claim 1 wherein said substrate comprises glass.

13. A method as defined in claim 1 wherein said substrate comprises glass cloth and glass plate.

14. A method as defined in claim 1 wherein said substrate comprises aromatic polycarbonate sheet.

15. A method of making a composite adhesively-bonded article which comprises:
- (1) applying to at least a part on one substrate a visible light-polymerizable composition consisting of:
  - (i) an epoxidic prepolymer:
  - (ii) an effective amount of a catalyst precursor therefor comprising an aromatic iodonium salt of a complex halogenide; and
  - (iii) a small but effective amount of a catalyst activator comprising a dye;
- (2) exposing said composition to a low intensity source of visible light for not substantially longer than required to initiate polymerization therein and discontinuing exposure to said source of light;
- (3) simultaneously with discontinuing exposure or thereafter bringing the exposed surface of the composition-coated substrate into close contact with at least a part of the same or a different substrate to produce a temporary adhesive bond therebetween; and
- (4) allowing sufficient time in the dark to elapse for the composition to substantially completely self-polymerize and produce a permanent adhesive bond.

* * * * *